No. 824,457. PATENTED JUNE 26, 1906.
H. T. & S. G. WASHBURN.
LOADING APPARATUS.
APPLICATION FILED AUG. 7, 1905.

4 SHEETS—SHEET 1.

Fig. 1.

WITNESSES:
Geo. W. Naylor
E. E. Ellis

INVENTORS
Henry T. Washburn
Selden G. Washburn
BY Munn & Co.
ATTORNEYS

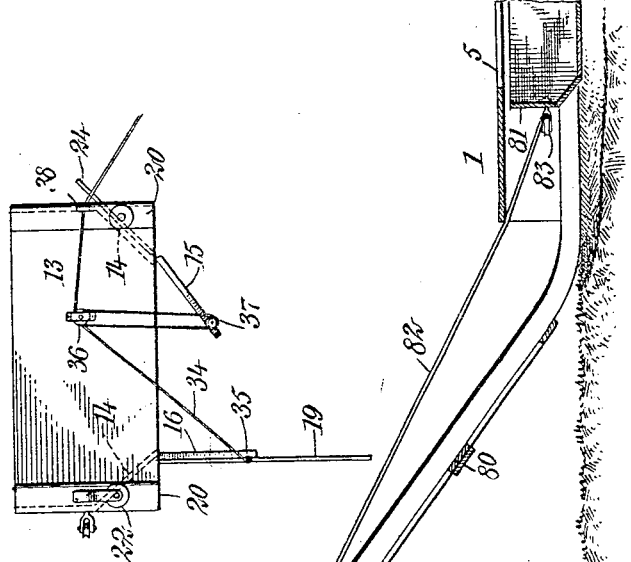

No. 824,457. PATENTED JUNE 26, 1906.
H. T. & S. G. WASHBURN.
LOADING APPARATUS.
APPLICATION FILED AUG. 7, 1905.
4 SHEETS—SHEET 3.
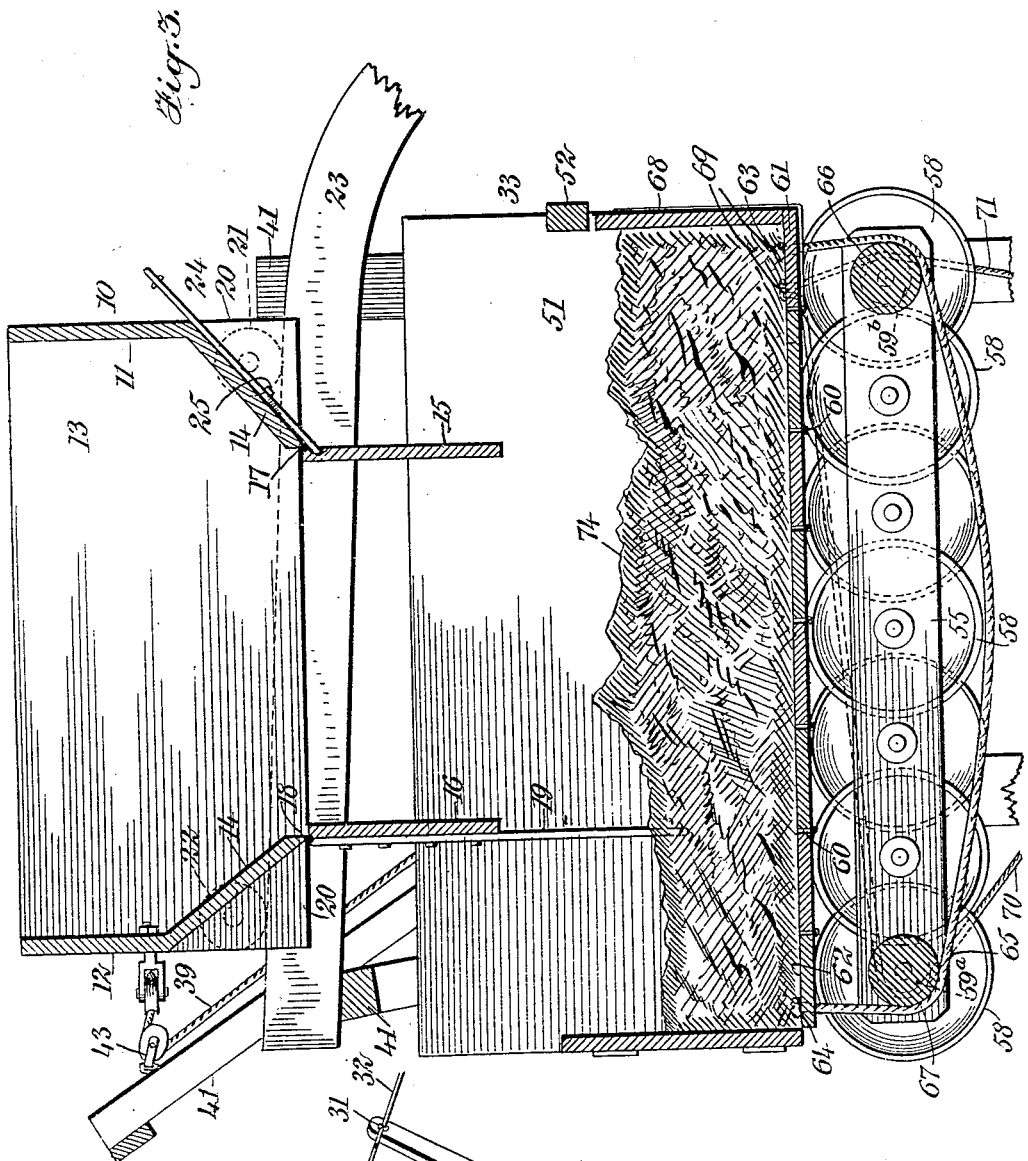

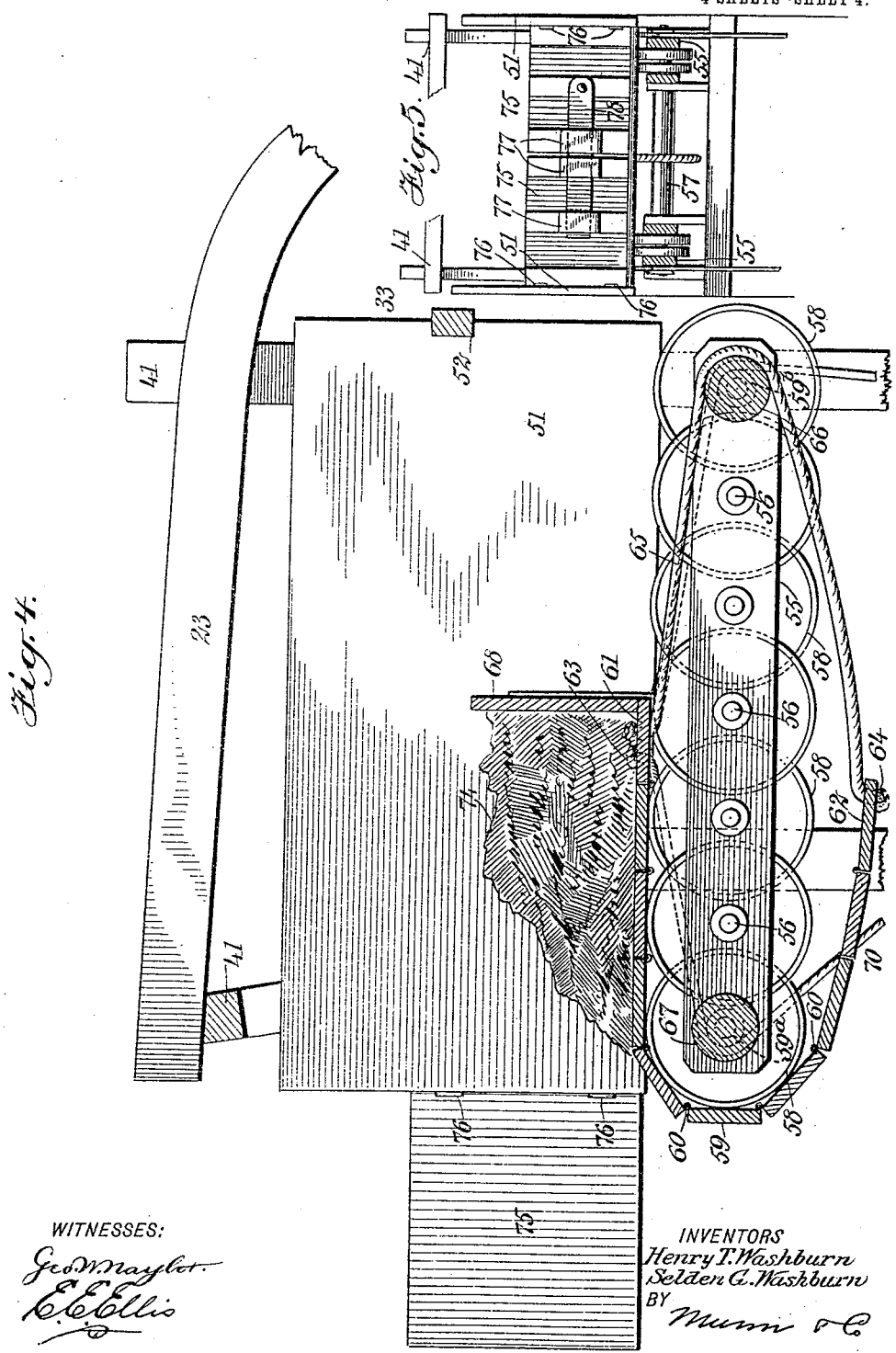

UNITED STATES PATENT OFFICE.

HENRY THEODORE WASHBURN AND SELDEN GARDNER WASHBURN, OF GOODWIN, SOUTH DAKOTA.

LOADING APPARATUS.

No. 824,457.  Specification of Letters Patent.  Patented June 26, 1906.

Application filed August 7, 1905. Serial No. 273,042.

*To all whom it may concern:*

Be it known that we, HENRY THEODORE WASHBURN and SELDEN GARDNER WASHBURN, citizens of the United States, and residents of Goodwin, in the county of Deuel and State of South Dakota, have invented a new and Improved Loading Apparatus, of which the following is a full, clear, and exact description.

This invention relates to loading apparatus; and it consists substantially in the details of construction and combinations of parts hereinafter more particularly described, and pointed out in the claims.

The invention has reference more especially to apparatus for loading manure and like materials in the field; and one of the principal objects thereof is to provide an apparatus of this kind which is simple in its embodiment and comparatively inexpensive to manufacture, besides being portable or readily moved from one place in the field to another, thoroughly effective and reliable for its purpose, and possessing the capacity for long and repeated service.

The above and additional objects are attained by means substantially such as are illustrated in the accompanying drawings, in which—

Figure 1 is a perspective view of a manure-loading apparatus embodying our improvements, said view representing the apparatus complete as it appears in operation in the field. Fig. 2 is a sectional side view thereof, representing the construction and organization of some of the parts more clearly. Fig. 3 is an enlarged transverse sectional view indicating more clearly the construction and operation of the movable car and the movable receiver for the manure or other material from the car. Fig. 4 is an enlarged sectional detail view of the receiver, illustrating more clearly the movable floor thereof and the means for operating the same. Fig. 5 is an end view of the receiver looking from the left in Fig. 4, this view being on a reduced scale from said Fig. 4. Fig. 6 is a side view of the movable car, showing more clearly the preferred devices for restoring to position the tilting floor-sections thereof after the same have been released automatically to dump the manure or other material into the receiver; and Fig. 7 is a view in perspective representing the locking devices on the car for retaining the dumping floor-sections of the car in position while the latter is filled.

Before proceeding with a more detailed description it may be stated that in the form of our improvements herein shown we employ special means for gathering the manure or other material from the field and for successively delivering loads thereof to a car or vehicle which is caused to be carried into juxtaposition with such means, said car being of special construction and operation. A specially-constructed inclined way is also employed, upon which said car travels back and forth from the surface of the field to a specially-constructed receiver for the manure, elevated at a desired height and being equipped with special means for delivering the manure received thereby into a wagon or other vehicle—as a manure-spreader, for instance—which may be moved or carried to proper position beneath the structure for that purpose. The structure is supported in part by a frame suitably braced and strengthened and which is mounted, preferably, on skids, (although wheels may be employed in some instances,) thus to enable the entire apparatus to be conveniently moved from one part of the field to another for effective operations.

Reference being had to the drawings by the designating characters thereon, 1 represents a suitable arched bridge constructed in any preferred way, as of boards 2, connected at each of their ends to girders 3, suitably supported by uprights 4 or in any other suitable way, it being noted that said bridge is provided, preferably, at about the center thereof with an opening 5 of rectangular or other desired shape.

Disposed upon the bridge 1 at one side of the said opening 5 therein is a rake 6 or other device for gathering manure or other material from parts of the field adjacent to that in which the bridge may be temporarily placed. Said rake may be of any suitable construction, preferably having teeth or prongs 7 for properly gathering the material from the field and carrying it onto the bridge from one end or the other of the latter, suitable draft appliances 8 being provided at the forward part of the rake to enable one or more horses or other animals to be hitched thereto to drag or pull the same along. Handles 9 may be applied to the rearward portion of the rake to enable the latter to be properly directed or guided by an operator, and it will be observed that said rake is of dimensions considerably larger than the dimensions of the opening 5 on the bridge, so that the rake may be safely carried across the bridge without liability to falling through said opening.

The principal purpose of the bridge 1 is to receive beneath the same some form of car or other vehicle which is to be loaded with the manure or other material, the car being caused to be run under the bridge directly beneath the opening 5 therein, while the rake with its gathered material is moved up to the opening from one end or the other of the bridge thus to deliver such material into the car, it being stated that two horses (not shown) are usually employed to propel the rake, one passing along the ground to either side of the bridge, as will be understood.

The car preferably employed by us into which the manure or other material is delivered from the said rake 6 is indicated in entirety at 10 in Figs. 1 and 3, and comprises in the main the front and rear walls 11 and 12, respectively, and the side walls 13, the said front and rear walls being preferably provided with opposite downwardly and inwardly inclined sections 14 to facilitate the emptying of the load of the car, as will presently be explained. The car is provided with a bottom or floor constructed of coöperating sections 15 and 16, the one being hinged at 17 to the lower edge of the inclined sections 14 of the front wall of the car and the other being similarly hinged at 18 to the lower edge of the inclined sections 14 of the rear wall of the car and being provided with an extension or bar 19, adapted when the floor sections 15 and 16 are in closed positions to lie against the under side of said floor-section 15, thus to hold the latter in place until the two sections are automatically released to dump the contents of the car, as will presently be explained. The opposite lower corner portions 20 of the side walls 13 of the car have rotatably mounted therein the journals of sets of supporting-wheels 21 and 22 for the car, said wheels being located to travel up and down on parallel inclined ways 23 in Figs. 1 and 2, it being mentioned that in order to retain the two said floor-sections 15 and 16 in closed relation to each other and to the body of the car the said extension or bar 19 on the section 16 is of such length as to project sufficiently beyond the hinged edge of section 15 (when the two sections are closed) to be engaged by any suitable locking device therefor. As herein shown, said locking device comprises a lever 24, (see Figs. 1 and 7,) pivoted at 25 to have rocking movement transversely of the outer face of the inclined section 14 of the front wall 11 of the car, the lower end of said lever being formed with a notch 26 and a hook 27, the former coöperating with a notch 28 in the adjacent edge of a plate 29, secured to said inclined section 14. These notches between them receive the projecting end of the extension or bar 19 of floor-section 16 of the car when the two said floor-sections are closed, the upper end of the arm a of the lever being normally acted upon by a spring 30 to carry the arm b thereof against the said plate 29, said spring having one of its ends suitably secured to said inclined section 14 and the other within an opening 31 in the end of the said arm a of the lever. When the said projecting end of the extension or bar 19 is within the notches 26 and 28, the hook 27 of the lever engages with the under side of said end, as will be apparent, and for the purpose of causing the floor-sections 15 and 16 of the car to be automatically released when the car has been caused to move to the upper end of the said inclined ways 23, as and for the purpose to be presently described, we employ a cord or chain 32, having one end thereof secured in said opening 31 in the said arm a of the lever 24 and its other end secured to any suitable part of one of said inclined ways 23. When the car reaches a predetermined height, this cord or chain will be jerked or pulled upon in such manner as to swing the lever 24 on its pivot, thus releasing the projecting end of extension or bar 19, and permitting the floor-sections of the car to fall under the weight of the load thereon, and thus dump such load into a suitable receiver 33 therefor, presently to be explained.

In order to restore the floor-sections of the car to closed and locked relation, any suitable means may be employed, comprising in the present instance (see Fig. 1 and detail Fig. 6) a rope or cable 34, having an end thereof secured at 35 to an edge of the floor-section 16 near the free end thereof, said cord or cable being thence carried over the innermost member of a double pulley 36, mounted on the adjacent or corresponding side wall 13 of the car, thence downward over a pulley 37, mounted on the like edge of floor-section 15 near the free end thereof and thence upward and over the other member of said double pulley 36, said cord or cable being finally carried through a guide 38 therefor in the car. It is apparent that when the floor-sections 15 and 16 are to be closed it is simply necessary to pull upon this cord or cable, and the latter may also be employed to pull upon the entire car for the purpose of starting down the inclined ways 23 whenever desired. In order to carry or propel the loaded car 10 upwardly of the said inclined ways 23, suitable means may be employed, herein indicated as a rope or cable 39 having an end thereof secured at 40 to a part of the supporting-frame 41 for the said receiver 33, thence extending to and around a sheave-pulley 42, mounted at the outer side of the rear wall 12 of the car, thence upward and over a sheave-pulley 43, secured to another part of said supporting-frame 41, thence downwardly and beneath a pulley 44, suitably supported at the base of the frame, and finally having the free end 45 thereof lead off in any suitable way and to which a horse or other animal may be hitched to move the said car up the ways, it being obvious that the descent thereof is effected by gravity. The said supporting-frame 41 for the receiver 33 is mounted at a suitable height upon pairs of uprights 46, the lower ends of which are in turn mounted upon skids or runners (or wheels may be employed) 47, suitably connected by cross-braces 48, the upper portions of the said uprights being preferably connected with the forward ends of said skids by means of braces 49, the uprights of each pair being also preferably connected with each other by means of crossed braces 50. The said receiver 33 is constructed, preferably, of parallel stationary side sections 51, connected forwardly of the structure by means of a transverse bar or member 52 and having secured thereto forwardly at 53 the crossed hangers 54, the lower ends of which extend adjacent to the lower edges of said side sections 51 and by which are supported the parallel bearing-strips 55 for the journals 56 of a plurality of transversely-disposed shafts 57, carrying rollers 58, alternating with each other in position relatively to the ends of the shafts, thus to furnish as broad rotatable surfaces as possible for the movable bottom 59 of the receiver, comprising a series of slats hinged or otherwise movably joined together at 60, the forward and rearward ones 61 and 62, respectively, of the normally uppermost of said slats being connected together at 63 and 64 by means of a rope or length of cable 65 passing around rollers 66 and 67, mounted between the forward and rearward ends, respectively, of the said mentioned parallel bearing-strips 55 for the shafts of the said rollers 58. The said forward slat 61 is provided rigidly with a vertical section 68 to prevent the manure or other material from falling out of the corresponding end of the receiver when emptied into the latter from the elevated car 10, and connected also to said slat 61 at 69 are the ends of pairs of ropes or cables 70 and 71, the former of which extend beneath the slatted bottom 59 of the receiver to and over guide-pulleys (see Figs. 3 and 4) 59$^a$ therefor near the ends of the roller 66, thence forwardly and downwardly to and around a winding-shaft 72 therefor, mounted in suitable bearings in the forward set of uprights 46 for the supporting-frame 41, and the latter (cables 71) of which extend either over the roller 66 itself or over guide-pulleys 59$^b$, Figs. 3 and 4, therefor on said roller, thence to and around said winding-shaft 72 in an opposite direction to said ropes or cables 70, it being mentioned that said shaft 72 is provided at one end with an operating crank or handle 73. Thus by turning said shaft 72 in one direction the movable slatted bottom of the receiver will be caused to travel rearwardly with the load 74 of manure, as indicated in Fig. 4, to deliver such load from the rearward end of the casing between the said stationary side sections 51 thereof into a wagon or the like (not shown) which may be either drawn or backed up in proper position beneath the receiver, as will be understood. What we have herein termed the "rearward" end of the receiver may be temporarily closed by means of doors 75, hinged at 76 to swing outwardly, as shown in Figs. 4 and 5, said doors being provided with outturned brackets 77 for receiving a bar 78, pivoted on one of said doors at 79 to lock the doors closed.

The section or length of cable 65 is for preventing undue sagging of the slats of the movable bottom 59 under the weight of the loads precipitated thereon, and it is thought the construction and operation of our improved loading apparatus will be fully understood without further detailed description.

The parallel ways 23 may be connected by suitable crossed or other braces 80, and, as shown in Fig. 2, we may sometimes employ a scoop or bucket 81 in lieu of the car 10, in which case we employ a hoisting-cable 82 for said scoop or bucket, the latter being provided with a sheave-pulley 83, around which said cable extends and which also extends over guide-pulleys 84 and 85, mounted at the upper and lower parts, respectively, of the structure, as shown. As the slatted flooring of the receiver is moved rearwardly to empty the manure into a wagon or the like below said flooring moves around beneath its supporting-rollers, as shown in Fig. 4. When the floor-sections 15 and 16 of the car 10 are carried upwardly to closed position, it is apparent that the end of bar 19 will strike the under curved edge of hook 27 of the lever 24, thus moving the lever sufficiently to enable such end to pass within the notches 26 and 28 of the locking device therefor.

Having thus described the invention, we claim as new and desire to secure by Letters Patent—

1. An apparatus for loading manure and the like in the field, comprising a vehicle into which the material is loaded, means for hoisting the loaded vehicle to a suitable height, and a receiver into which the material is dumped from the vehicle, the said vehicle having hinged dropping-sections, an automatic locking device for retaining the sections in closed position, and means for automatically moving the locking device to release the sections when the vehicle reaches the desired height.

2. In an apparatus for loading manure and the like, a vehicle into which the material is loaded and means for hoisting the vehicle to a suitable height, the said vehicle having dropping-sections, an automatic device for retaining the sections in position when closed, and automatic means for releasing the sections when the vehicle reaches the desired height.

3. In an apparatus for loading manure and the like, a vehicle into which the material is loaded and from which it is discharged, and means for hoisting the loaded vehicle to a suitable height, the said vehicle having hinged dropping-sections, an automatic device for retaining the sections in position when closed, means for releasing the sections when the vehicle reaches the desired height, and means for carrying the said sections to closed position.

4. An apparatus for loading manure and the like in the field, comprising a vehicle into which the manure is loaded, means for hoisting the loaded vehicle to a suitable height, and a receiver into which the manure is dumped from the vehicle, the latter embodying hinged dropping-sections, one having a member normally lying against and extending beyond the under side of the other, and a spring-controlled locking device for the two sections constructed of a plate having a notch therein, and a lever having a notch and a hook, said notches receiving an end of said member.

5. An apparatus for loading manure and the like, comprising a vehicle into which the manure is loaded, means for hoisting the loaded vehicle to a suitable height, a receiver into which the manure is dumped from the vehicle, the latter being constructed with hinged dropping-sections, automatic devices for retaining the sections in closed position to hold the load thereon, means operating to release the sections on the vehicle reaching such height, and means for carrying said sections to closed position to be again locked therein.

6. An apparatus for loading manure and the like, comprising a vehicle into which the manure is loaded, means for hoisting the loaded vehicle to a suitable height, a receiver into which the manure is dumped from the vehicle, the latter being constructed with hinged dropping-sections, automatic devices for retaining the sections in closed positon to hold the load thereon, means operating to release the sections on the vehicle reaching such height, means for carrying said sections to closed position to be again locked therein, embodying a cable attached to one of the sections, a guide and a double pulley on the vehicle, around one part of which pulley the cable extends, and another pulley on the other of the sections also around which said cable extends, thence around the other part of said double pulley and through said guide.

7. An apparatus for loading manure and the like in the field, comprising a vehicle into which the material is loaded, means for hoisting the loaded vehicle to a suitable height, the said means including parallel inclined ways, and a receiver supported beneath the upper part of the inclined ways, and into which the material is dumped from the vehicle, the said vehicle being provided with hinged dropping-sections, a device for retaining the sections in closed position, and means for automatically releasing said sections, when the vehicle reaches the upper end of the inclined ways, to permit the sections to drop.

8. An apparatus for loading manure and the like in the field, comprising a vehicle, means for delivering the material to the vehicle, means for hoisting the loaded vehicle to a suitable height, and a receiver at such height into which the material is dumped from the vehicle, said vehicle having hinged dropping-sections, means for automatically locking the sections in position when closed, means for releasing the sections when the vehicle reaches the dumping position, and means for carrying the sections to closed position after the material is dumped.

In testimony whereof we have signed our names to this specification in the presence of two subscribing witnesses.

HENRY THEODORE WASHBURN.
SELDEN GARDNER WASHBURN.

Witnesses:
WILLIAM ROHWEDER,
CHAS. DAHL.